US009002000B2

(12) United States Patent
Seurin et al.

(10) Patent No.: US 9,002,000 B2
(45) Date of Patent: Apr. 7, 2015

(54) METHOD FOR CONVERSION OF A FIRST ENCRYPTION INTO A SECOND ENCRYPTION

(75) Inventors: Yannick Seurin, Saulx les Chatreux (FR); Henri Gilbert, Bures sur Yvette (FR)

(73) Assignee: Orange, Paris (FR)

( * ) Notice: Subject to any disclaimer, the term of this patent is extended or adjusted under 35 U.S.C. 154(b) by 382 days.

(21) Appl. No.: 13/386,048

(22) PCT Filed: Jul. 21, 2010

(86) PCT No.: PCT/FR2010/051544
§ 371 (c)(1),
(2), (4) Date: Sep. 5, 2012

(87) PCT Pub. No.: WO2011/010068
PCT Pub. Date: Jan. 27, 2011

(65) Prior Publication Data
US 2012/0321074 A1 Dec. 20, 2012

(30) Foreign Application Priority Data
Jul. 23, 2009 (FR) ...................................... 09 55153

(51) Int. Cl.
*H04L 9/28* (2006.01)
*H04L 9/06* (2006.01)

(52) U.S. Cl.
CPC .............. *H04L 9/06* (2013.01); *H04L 2209/76* (2013.01); *H04L 2209/08* (2013.01); *H04L 2209/34* (2013.01)

(58) Field of Classification Search
CPC . H04L 9/0618; H04K 1/00; H04N 2201/3281
USPC ................................................ 380/28–29, 37
See application file for complete search history.

(56) References Cited

U.S. PATENT DOCUMENTS

| 5,539,827 | A * | 7/1996 | Liu .................................. 380/37 |
| 7,720,140 | B2 * | 5/2010 | Guevorkian et al. .......... 375/232 |
| 2004/0202318 | A1 * | 10/2004 | Lu ................................... 380/29 |

FOREIGN PATENT DOCUMENTS

EP    1 065 593 A1    1/2001

OTHER PUBLICATIONS

Ateniese et al., "Improved Proxy Re-encryption Schemes with Applications to Secure Distributed Storage," ACM Transactions on Information and System Security, ACM, New York, NY, US, vol. 9(1), pp. 1-30 (Feb. 1, 2006).

(Continued)

*Primary Examiner* — Thanhnga B Truong
(74) *Attorney, Agent, or Firm* — Drinker Biddle & Reath LLP

(57) ABSTRACT

A method for converting, by means of a conversion entity, a first digit into a second digit, the first cipher corresponding to the result of a symmetric probabilistic encryption of an plain message element using a first secret matrix parameterized by a random vector, the second digit corresponding to the result of a symmetric probabilistic encryption of the plain message element using a second secret matrix that is parameterized by the random vector, characterized in that the method includes a step of: calculating the second digit by encrypting the first digit using a secret conversion matrix which is a function of the first and second secret matrices, and which is parameterized by the random vector.

9 Claims, 2 Drawing Sheets

(56) References Cited

OTHER PUBLICATIONS

Dodis et al., "On Cryptography with Auxiliary Input," retrieved from internet website: http://delivery.acm.org/10.1145/1540000/1536498/p621-dodis.pdf?key1=1536498&key2=8735352721&coll=GUIDE&dl=GUIDE&CFID=86452176&CFTOKEN=35776680, pp. 621-630 (Jun. 2, 2009).

Gilbert et al., "How to Encrypt with the LPN Problem," ICALP'08, Lecture Notes in Computer Science, Springer Verlag, retrieved from internet website: http://www.springerlink.com/content/p205hk439856t270/fulltext.pdf, vol. 5126, pp. 679-690 (Jul. 5, 2008).

* cited by examiner

METHOD FOR CONVERSION OF A FIRST ENCRYPTION INTO A SECOND ENCRYPTION

CROSS-REFERENCE TO RELATED APPLICATIONS

This application is the U.S. national phase of the International Patent Application No. PCT/FR2010/051544 filed Jul. 21, 2010, which claims the benefit of French Application No. 0955153 filed Jul. 23, 2009, the entire content of which is incorporated herein by reference.

FIELD OF THE INVENTION

The present invention relates to the field of secret key cryptography. More precisely, the invention relates to a method for conversion by a conversion entity of a first ciphertext into a second ciphertext.

BACKGROUND

One interesting application of the invention is in services referred to as recipherment designed to receive an encrypted content from a first entity and to transmit it encrypted for the attention of a second entity.

In symmetric cryptography, the transmitter and the receiver of a message share the knowledge of the same secret key K. The latter allows the transmitter to transform a plaintext message into a cryptogram, or ciphertext message, and the receiver to recover the plaintext message starting from the ciphertext message.

Some applications require an intermediate entity between the transmitter and the receiver to convert a first ciphertext C1 of a plaintext message M, obtained by a first entity U1 by means of a first secret key K1, into a second ciphertext C2 of the same plaintext message M by means of a second secret key K2 for a second entity U2. The second entity U2 that holds the second secret key K2 is capable of obtaining the plaintext message by decrypting the second ciphertext C2. One example of such a service consists of a remote storage service for contents. The first entity transmits data encrypted by means of its secret key K1 to a remote storage server. Subsequently, the first entity U1 wishes to grant a second entity U2 access to its data without revealing its secret key to this entity. One obvious way of proceeding consists in transmitting to the intermediate entity, in this case the remote server, the secret keys K1 and K2 of the two entities in order that the intermediate entity decrypts, by means of the key K1, the first ciphertext C1 in order to obtain the plaintext message M, then encrypts by means of the secret key K2 of the second entity the message M obtained for the attention of the second entity U2. However, by proceeding in this manner, the intermediate entity becomes aware of the plaintext message M. Moreover, the intermediate entity holds the respective secret keys of the entities. It is however understandable that users who wish to implement such a service might not trust the intermediate entity. Thus, it is understandable that users would wish, for reasons of confidentiality, to have the guarantee that the intermediate entity cannot access the unencrypted message and that, furthermore, they would not wish, for reasons of security, to transmit their secret key to the intermediate entity.

The obvious way of proceeding may not therefore be suitable. But no method exists that allows re-encryption for another user in the framework of secret key cryptography.

SUMMARY

In order to overcome the problems identified hereinabove, the invention provides a method for conversion by a conversion entity of a first ciphertext into a second ciphertext, the first ciphertext corresponding to the result of a symmetrical probabilistic encryption of a plaintext message element by means of a first secret matrix whose parameters are generated by a random vector, the second ciphertext corresponding to the result of a symmetrical probabilistic encryption of the plaintext message element by means of a second secret matrix whose parameters are generated by the random vector, characterized by the fact that the method comprises a step for calculation of the second ciphertext by encrypting the first ciphertext by means of a secret conversion matrix, being a function of the first and second secret matrices, and whose parameters are generated by the random vector.

Firstly, it will be noted that, by definition, a "message element" comprises all or part of a message.

With the method of the invention, it becomes possible, in a context of symmetrical cryptography, to convert a first ciphertext of a plaintext message, obtained by means of a first secret key, into a second ciphertext of the same plaintext message designed to be decrypted by means of a second secret key. This conversion is carried out without the entity responsible for the conversion being able to know the associated plaintext message corresponding to these two ciphertexts. Indeed, the conversion entity processes the first ciphertext which results from a symmetrical probabilistic encryption by means of a first secret matrix, but it does not have the first secret matrix which would allow it to decrypt the first ciphertext in order to obtain the plaintext message. Similarly, the conversion entity calculates the second ciphertext, intended to be decrypted according to a dissymmetrical probabilistic encryption by means of a second secret matrix, but it does not have the second secret matrix which would allow it to decrypt the second ciphertext in order to obtain the plaintext message. Indeed, to perform the conversion of the first ciphertext into the second ciphertext the conversion entity uses a conversion matrix which provides no information on the secret matrices. Thus, it is not possible, using the conversion matrix, to discover the first or the second secret matrices.

It should furthermore be noted that the conversion method is symmetric in the sense that the conversion entity is also designed to convert the associated second ciphertext obtained by probabilistic symmetrical encryption by means of the second secret matrix into the first ciphertext associated with the first secret matrix by using the same conversion matrix as for a conversion of the first ciphertext into the second ciphertext.

In one embodiment of the invention, the method comprises a step for:
  reception of the first ciphertext coupled with the random vector coming from a first entity,
  transmission of the second ciphertext coupled with the random vector to a second entity.

This embodiment corresponds to a use of the conversion method by two entities for transmitting encoded data from the first entity to the second entity. Entities, for example users who might use this conversion entity in the framework of an encoded data exchange service, would thus be reassured on the security implemented by the service, and confident with regard to the confidential nature of the transmitted data.

Advantageously, the secret conversion matrix is calculated by an EXCLUSIVE OR operation between the first and the second secret matrices.

Although calculated starting from the secret matrices of the first and second entities, the conversion matrix does not provide any information that would allow the first or the second secret matrix to be discovered. Thus, it is not possible to obtain the unencrypted message which is associated with the first and with the second ciphertext from the conversion matrix.

The invention is described here with a single conversion matrix calculated from two secret matrices, each matrix being associated with one entity. It will be understood that the conversion entity can implement the conversion method for n entities, with n>2. The entities are denoted $1, 2, \ldots, n$. In this case, the conversion entity only needs to store in its memory $(n-1)$ conversion matrices. $(n-1)$ conversion matrices $M_{12}$, $M_{23}, M_{34}, \ldots, M_{n-n}$ are then calculated which are transmitted to the conversion entity. It is indeed noted that it is not necessary to calculate all the conversion matrices specific to all the couples of entities $(i, j)$. Indeed, it is possible to obtain a conversion matrix for a couple $(i, j)$ with $j>i+1$, starting from the calculated matrices. Indeed, it is noted that $M_{ij} = M_{i(i+1)} \oplus \ldots \oplus M_{(1+(j-i-1))j}$.

Advantageously, the conversion matrix is a Toeplitz matrix. It is known that, with a Toeplitz matrix, the coefficients on a diagonal descending from left to right are the same. Thus, all of the coefficients of the conversion matrix $M_{12}$ can be deduced from the coefficients of the first row and of the first column of the matrix only. Accordingly, it suffices to store only the coefficients of the first row and of the first column of the conversion matrix in order to dispose of all of the coefficients of the conversion matrix. This is advantageous when the conversion entity only has a small amount of storage memory available.

According to one embodiment of the invention, the conversion matrix is obtained by the conversion entity from a confidence entity which calculates the conversion matrix by means of the first and second secret matrices respectively transmitted by the first and the second entity.

In this embodiment, the conversion matrix is calculated by a confidence entity from the first and second secret matrices that the first and second entities have sent to it. Once calculated, the conversion matrix is made available to the conversion entity. It is observed that the operation that is difficult in terms of security, which consists in manipulating the first and second secret matrices in order to calculate the conversion matrix, is carried out with a maximum security by a dedicated entity in which the first and second entities have confidence.

The invention also relates to a method for transmission of an unencrypted message element in an encrypted form between a first and a second entity, comprising a step for:
  encryption by the first entity by means of a symmetrical probabilistic encryption of the unencrypted message by means of a first secret matrix, whose parameters are generated by a random vector, so as to obtain a first ciphertext,
  transmission of the first encryption coupled with the random vector to a conversion entity,
  conversion by the conversion entity of the first ciphertext into a second ciphertext according to the conversion method,
  transmission by the conversion entity of the second ciphertext coupled with the random vector to the second entity,
  reception by the second entity of the second ciphertext coupled with the random vector,
  decryption by the second entity of the second ciphertext by means of a second secret matrix by dissymmetrical probabilistic encryption.

The method corresponds here to a method for end-to-end transmission which incorporates a conversion of a first ciphertext into a second ciphertext.

The invention also relates to a conversion entity designed to convert a first ciphertext into a second ciphertext, the first ciphertext corresponding to the result of a symmetrical probabilistic encryption of an plaintext message element by means of a first secret matrix whose parameters are generated by a random vector, the second ciphertext corresponding to the result of a symmetrical probabilistic encryption of the plaintext message element by means of a second secret matrix whose parameters are generated by the random vector, the conversion entity comprising:
  means for calculating the second ciphertext, designed for calculating the second ciphertext by encryption of the first received ciphertext by means of a secret conversion matrix being a function of the first and second secret matrices, and whose parameters are generated by the random vector.

In one embodiment of the invention, the conversion entity furthermore comprises:
  reception means designed to receive the first ciphertext coupled to a random vector,
  transmission means designed to send the second ciphertext coupled with the random vector.

The invention also relates to a conversion system designed to convert a first ciphertext into a second ciphertext, the first ciphertext corresponding to the result of a symmetrical probabilistic encryption of a plaintext message element by means of a first secret matrix whose parameters are generated by a random vector, the second ciphertext corresponding to the result of a symmetrical probabilistic encryption of the plaintext message element by means of a second secret matrix whose parameters are generated by the random vector, the system comprising:
  a conversion entity according to the invention,
  a confidence entity designed to calculate the conversion matrix from the secret matrices.

The invention also relates to a computer program designed to be installed in a memory of an intermediate entity, comprising instructions for implementing the steps of the conversion method according to the invention, when the program is executed by a processor.

The invention also relates to a data media on which the computer program according to the invention is recorded.

BRIEF DESCRIPTION OF THE DRAWINGS

Other features and advantages of the present invention will be better understood from the description and from the appended drawings, amongst which.

DETAILED DESCRIPTION

Figure 1A:
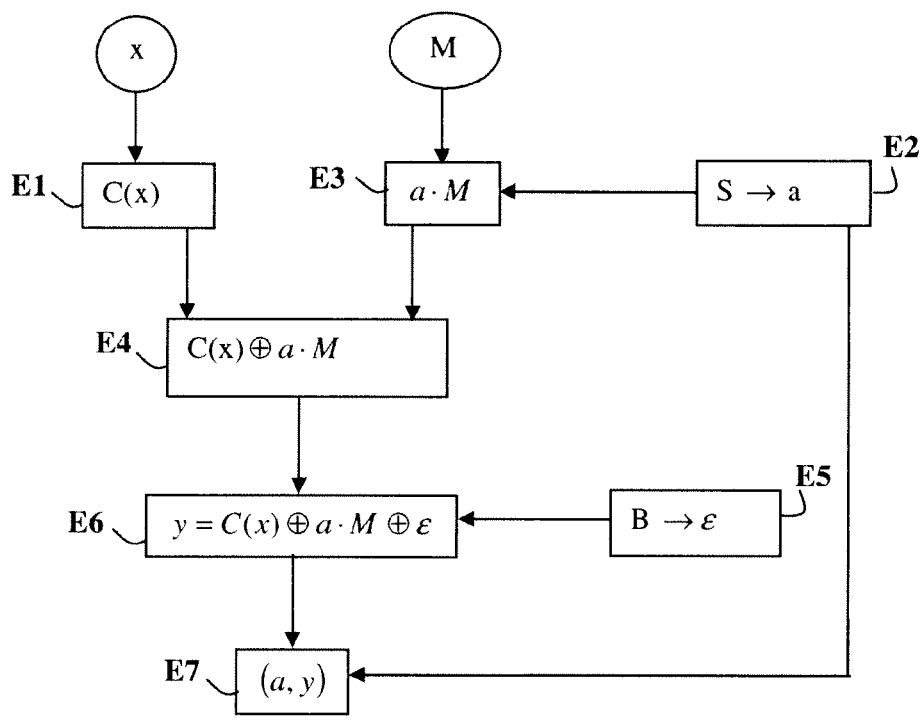
FIGS. 1a and 1b show, respectively, a flow diagram of the steps of a method for probabilistic symmetrical encryption, and a flow diagram of the steps of a method for symmetrical decryption according to the prior art.

The conversion method according to the invention is based on a symmetrical probabilistic encryption/decryption such as described in [GRS08] (H. Gilbert, M. Robshaw, and Y. Seurin. How to Encrypt with the LPN Problem? In ICALP'08, Lectures Notes in Computer Science, volume 5126, p.679-690, Springer Verlag, 2008). An encryption is referred to as "probabilistic" when it introduces a random number into the encryption. Thus, when the same plaintext message is encrypted twice, two different ciphertext messages are obtained with a high probability. The probabilistic encryption used in the framework of the present invention is based on the combination of an encoding by error corrector code and on the addition of a noise. This combination has the effect of rendering the decryption of the ciphertext by an adverse party more difficult while at the same time being designed to be naturally eliminated by the decoding of the error corrector code. With this encryption, it is possible to prove the security by a reductionist approach consisting in translating the security into a hypothesis on the difficulty of solving a known problem. In other words, it is possible to prove that, in order to break the security of this method of encryption, a perpetrator must be capable of solving a known problem, presumed to be difficult. With regard to the present encryption, the well-defined and well-known problem is the "LPN" (for "Learning Parity with Noise") problem.

The steps of the methods of encryption and of decryption according to one particular embodiment will be described in relation to FIGS. 1a and 1b. According to the prior art, the method of symmetrical probabilistic encryption uses a secret key shared by a first and a second entity, one for encryption and the other for decryption, respectively referenced 1 and 2. The decryption entity 2 is capable of implementing a method for decryption, or for restoration, of a plaintext message x starting from the ciphertext message supplied by the first entity 1. The secret key can be represented in the form of a matrix M with k rows and n columns, with 1≤k and 1≤n.

The encryption entity 1 and the decryption entity 2 are here respectively integrated into a transmitter unit of communications equipment and into a receiver unit of communications equipment, not shown, capable of communicating with each other, for example via a radio channel. For example, the transmitter equipment can be an RFID tag and the receiver equipment an associated reader.

The encryption is referred to as probabilistic owing to the fact that it uses a random number to calculate a ciphertext message starting from a plaintext message.

The plaintext message x is represented by a binary vector with R bits.

The method comprises a step E1 for encoding the plaintext message x with the aid of an error corrector code, denoted C.

An error corrector code is a technique well known to those skilled in the art, based on redundancy. Its usual purpose is to correct errors in transmission of a message over an unreliable communications channel. Information in the message transmitted over this channel runs the risk of being altered. The error corrector code has the role of adding redundant information to the message prior to its transmission. This redundant information allows the information in the message as received, which has been altered during the transmission, to be corrected.

In this case, the error corrector code is a linear code in blocks, denoted C. This corrector code C is of length n, of dimension r and of correction capacity t. In other words, the corrector code C is a function of the binary space of dimension r $\{0,1\}^r$ within the binary space of dimension n $\{0,1\}^n$. This function is designed to transform a message of r bits into a code word of n bits, with n>r, by the addition of redundancy bits. Furthermore, the corrector code C is designed to guarantee that, if a number of errors less than the correction capacity t is added to the code word, the decoding allows the original message to be restored.

In the particular example described here, it is assumed that the number of bits R in the message x is equal to the dimension r of the corrector code C.

The step E1 for encoding the message x therefore provides a code word represented by a vector with n bits, denoted C(x).

The method comprises a step E2 for generation of a random number a. In the example of this description, the random number a is a binary vector with k bits produced by a pseudo-random source with bits S.

The step E2 is followed by a step E3 for calculation of the product between the random vector a, in the form of row vector, and the matrix M representing the secret key. The result of the product a·M is represented by a vector with n bits.

Once the steps E1 to E3 have been carried out, the method implements a calculation step E4 during which the result of the product a·M is added to the code word C(x). In other words, the step E4 performs the operation C(x)⊕a·M. The role of the step E4 is to encode the code word C(x).

The method also comprises a step E5 for generation of a binary noise vector ϵ with n bits from a source of Bernoullian noise B. This is designed to produce independent bits with a value 1 and with a probability η and independent bits with a value 0 and with a probability 1−η, with $$\eta \in ]0, \frac{1}{2}[.$$

Furthermore, the noise source B is designed such that the probability δ for the Hamming weight of the noise vector ϵ to be greater than the correction capacity t of the corrector code is very low, below a predefined threshold Σ. By way of example, this threshold can be equal to $10^{-3}$. Depending on the application, it could be lower than this value. By definition, the Hamming weight of a binary vector is the number of bits different from 0, in other words with a value 1, in this vector. Thus, for the majority of the noise vectors ϵ generated by the source B, the Hamming weight of the vector ϵ, denoted Hwt(ϵ), is less than or equal to the correction capacity t of the corrector code C. In the particular example described here, in order to satisfy the condition relating to the probability δ, the parameters t, η and n verify the following relationship:

t>η*n.

Once the steps E4 and E5 have been carried out, the method implements a calculation step E6, in which the noise vector ϵ is added to the result of the operation E4, C(x)⊕a·M. The result of this operation E6 is a vector with n bits, denoted y, corresponding to the ciphertext message x. The latter is actually the code word C(x), in other words the encoded message x, encrypted and noisy.

Lastly, the method comprises a step E7 for transmission of the pair (a, y), in other words (a, C(x)⊕a·M⊕ϵ), from the transmitter communications equipment to the receiver communications equipment.

Figure 1B:
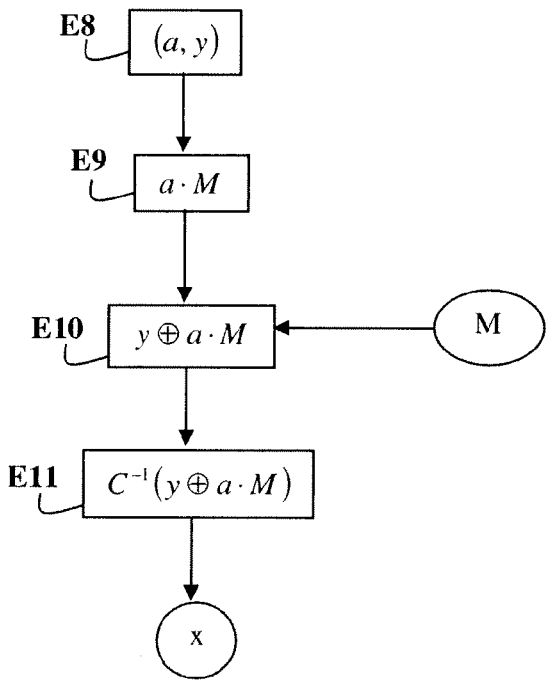

The pair (a, y) travel over a communications channel, here radio, until being received by the receiver equipment, during a step E8 shown in FIG. 1b. As a reminder, the receiver equipment incorporates a decryption entity capable of decrypting the encrypted received message y in order to recover the plaintext message x.

In a case where the plaintext message x is of size R bits with R>r, then the plaintext message is divided up into blocks of r bits, with the possibility of adding predetermined values in order to complete a block with r bits (usually referred to as 'padding') if the value R is not a multiple of the value r. The encryption method described is then applied to each block.

In FIG. 1b, the various steps are shown of the method for restoration, or for decryption, in order to recover the plaintext message x from the pair (a, y), implemented by the decryption entity 2.

As a reminder, the decryption entity 2 has the knowledge of the secret key represented by the secret matrix M.

The restoration method firstly comprises a calculation phase comprising two calculation steps E9 and E10.

During the first calculation step E9, the random vector a is extracted from the received pair (a, y) and the product a·M is calculated, a being represented in the form of a row vector with k bits.

During the calculation step E10, the vector with n bits resulting from the product a·M is added to the received vector y, in other words the calculation operation y⊕a·M is carried out. In binary, this operation corresponds to subtracting the result of the product a·M from the received vector y.

It will be noted that, since y is equal to the encrypted and noisy code word, namely C(x)⊕a·M⊕ε, the result of the calculation step E10 corresponds to the noisy code word only, namely C(x)⊕ε.

The method subsequently comprises a decoding phase E11, during which the result of the step E10 is decoded with the aid of the error corrector code used during the encryption. Since the Hamming weight of the noise vector ε is less than or equal to the correction capacity t of the error corrector code, the decoding directly provides the plaintext message x.

By way of example, a few exemplary embodiments of this encryption method will now be provided with real life parameters. It is recalled that the security of the encryption system depends on the difficulty of solving the LPN problem. Since this difficulty is based on the parameters k and η, corresponding to the number of bits in the random vector a and to the probability for a bit in the noise vector ε to have a value of 1, respectively, suitable values should be chosen for these parameters, allowing a high-level of security of the system to be guaranteed. Two examples of suitable values for these parameters k and η are the following:

k=512, η=0.125 k=768, η=0.05

It will furthermore be noted that, if the ciphertext message x is of size r bits, the total size of the transmitted ciphertext message, corresponding to the pair (a, y), is (n+k) bits, since the random vector a comprises k bits and the ciphertext y n bits. It is thus observed that the encryption is accompanied by a certain expansion of the message.

$$\sigma = \frac{(n+k)}{r}$$

denotes the expansion factor. In order to limit this expansion, with k fixed, the highest possible value of r and the lowest possible value of n should therefore be taken. It is furthermore recalled that the correction capacity t of the corrector code and the length n of the corrector code must verify the following condition: t>η*n in order to guarantee a correct decryption of the message in most of the cases.

A triplet of parameters of an error corrector code is denoted [n,r,d]. These parameters n, r and d respectively correspond to the length, the size and the minimum distance for the code. The minimum distance d for the code is a function of the correction capacity t, by the according to relationship:

$$t = \frac{d-1}{2}.$$

Four exemplary embodiments with real life parameters for the actual encoding and encryption will now be given:
 for the parameters k=512, η=0.125, the following may be used:
  a linear code whose parameters are given by the triplet [80, 27, 21] capable of correcting 10 errors, the expansion parameter σ then having a value 21;
  a linear code whose parameters are given by the triplet [160, 42, 42], capable of correcting 20 errors, the expansion factor σ then having a value 16.
 for the parameters k=768, η=0.05, the following may be used:
  a linear code whose parameters are given by the triplet [80, 53, 9] capable of correcting 4 errors, the expansion parameter σ then having a value 16;
  un linear code whose parameters are given by the triplet [160, 99, 17] capable of correcting 8 errors, the expansion factor σ then having a value 8.8.

In order to optimize the expansion factor σ, it is therefore desirable to use a large size k for the random vector, a probability η for each bit of the noise vector ε with a value 1 that is low and a code of substantial length n and of large dimension r. The expansion factor σ may also be decreased by increasing the size of the matrix M. Indeed, by taking a matrix with k rows and N*n columns, with N an integer strictly greater than 2, N blocks of r bits can be encrypted at the same time, with the same random vector of k bits. The expansion factor is then only equal to $$\sigma = \frac{N*n+k}{N*r}.$$

Figure 2:
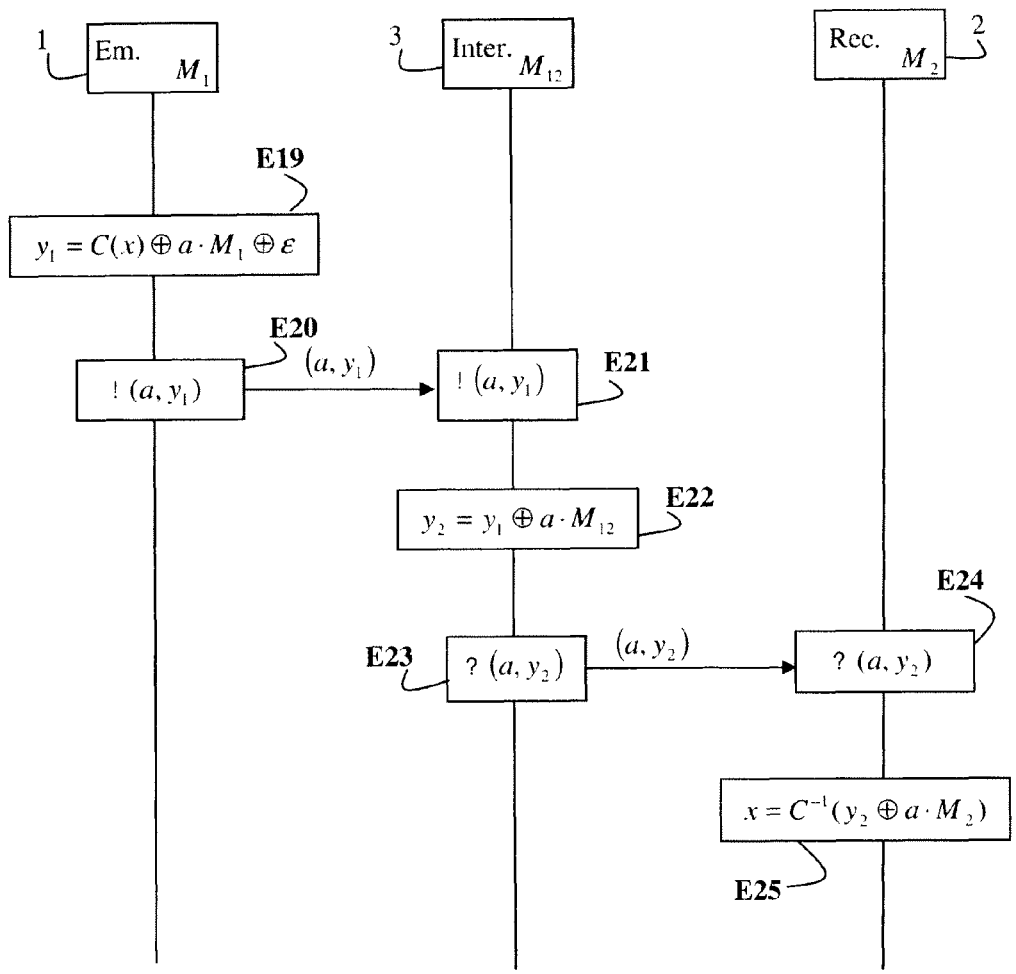
FIG. 2 shows a flow diagram of the steps of the method for conversion of a first ciphertext into a second ciphertext according to one particular embodiment described.

The conversion method according to one embodiment of the invention will now be described in relation to FIG. 2.

A conversion entity referenced 3 is capable of implementing the conversion method according to the invention. The entity 3 communicates with at least a first entity, referenced 1 and a second entity, referenced 2. The conversion entity 3 communicates with the entities 1 and 2 for example via a network. The first entity 1 is comparable to an encryption entity designed to implement the method of symmetrical probabilistic encryption described in relation to FIG. 1a. It possesses a secret key which may be represented in the form of a matrix $M_1$ of k rows and n columns, with 1≤k and 1≤n. The second entity 2 is designed to implement the decryption method described in relation to FIG. 1b. The second entity 2 possesses a second secret key which may be represented in the form of a second matrix $M_2$ of k rows and n columns. The invention described here is advantageous in a case where the secret matrices $M_1$ and $M_2$ of the first and second entities 1, 2 are different, in other words in a case where the entities 1 and 2 do not share a secret matrix. In a case where the first and the second entities share the knowledge of the same secret key represented by a matrix M, the encryption and decryption methods described in relation to FIGS. 1a and 1b are implemented by the first entity as an encryption entity, and by the second entity as a decryption entity. The two entities then use the same secret matrix.

It is assumed that it is desired to carry out a conversion of a plaintext message x with r bits encrypted by the first entity 1 by symmetrical probabilistic encryption by means of its secret matrix $M_1$ into a second ciphertext message for the attention of the second entity 2. In other words, it is desired that the second ciphertext message can be decrypted by the second entity 2 by means of its secret matrix $M_2$ and that the decryption of the second ciphertext message allows the second entity 2 to obtain the plaintext message x.

In a prior step E19 for calculation of the first ciphertext, the first entity 1 carries out the encryption of the plaintext message x with r bits, according to the method for symmetrical probabilistic encryption described in relation to FIG. 1a. To this end, the entity 1 encodes the message x by means of an error corrector code C of length m, of dimension r and of correction capacity t. It is recalled that, if a number of errors lower than t is added to C(x), the decoding procedure recovers the plaintext message x. The entity 1 also obtains a random vector a with k bits of a source S not shown in FIG. 2, and a noise vector $\epsilon$ of n bits produced by a source B not shown in FIG. 2. The entity 1 then calculates the first ciphertext $y_1$ by encryption of the code word C(x) by means of the secret matrix $M_1$ whose parameters are generated by the random vector a, and by adding the noise $\epsilon$ to the value obtained. In other words, the first entity calculates $y_1 = C(x) \oplus a \cdot M_1 \oplus \epsilon$.

In a step E20 for transmission of the first ciphertext, the first entity 1 sends the first ciphertext $y_1$, coupled with the random vector a, to the conversion entity 3.

In a reception step E21, the conversion entity 3 receives the first ciphertext message, coupled with the random vector ($y_1$, a), from the first entity 1.

In a step E22 for calculation of the second ciphertext, the conversion entity 3 calculates a second ciphertext $y_2$ intended to be decrypted by the second entity 2 by means of its secret matrix $M_2$. The conversion entity 3 extracts the random vector a of the received pair. The second ciphertext $y_2$ is calculated by adding to the first ciphertext $y_1$ the product between the random vector a, in the form of a row vector of k bits, with a conversion matrix $M_{12}$ representing a secret key specific to the conversion entity 3. In other words, $y_2 = y_1 \oplus a \cdot M_{12}$. The role of this step E21 is to encrypt the first ciphertext y1. This operation consisting in encrypting a value already encrypted is usually referred to as recipherment. The conversion matrix $M_{12}$ is stored by the conversion entity 3 in a memory not shown in FIG. 2. The conversion matrix $M_{12}$ has been previously calculated for example by a confidence entity not shown in FIG. 2 to which the first and second entities have transmitted their respective secret keys. The conversion matrix $M_{12}$ is calculated by the confidence entity by adding the matrix $M_1$ of the first entity 1 to the matrix $M_2$ of the second entity 2. Thus, $M_{12} = M_1 \oplus M_2$, where $\oplus$ represents a bit to bit addition, or an EXCLUSIVE OR operation.

In a transmission step E23, the conversion entity 3 sends the second ciphertext, coupled with the random vector a ($y_2$, a), to the second entity 2.

Thus, in a reception step E24, the second entity 2 receives the pair ($y_2$, a), where the second ciphertext $y_2$ corresponds to the encryption of $y_1$ by means of the conversion matrix whose parameters are generated by the random vector a. In other words, $y2 = y1 \oplus a \cdot M_{12}$. Since the first ciphertext $y_1$ has been obtained by symmetrical probabilistic encryption of the plaintext message x by means of the first secret matrix $M_1$ whose parameters are generated by the random vector a, then $y1 = C(x) \oplus a \cdot M_1 \oplus \epsilon$. Given furthermore that the conversion matrix $M_{12}$ has been obtained from the first and second secret matrices $M_1$ and $M_2$ by an EXCLUSIVE OR operation, it is then verified that:

$$y_2 = y_1 \oplus a \cdot M_{12} = C(x) \oplus a \cdot M_1 \oplus \epsilon \oplus a \cdot M_1 \oplus a \cdot M_2 = C(X) \oplus a \cdot M_2 \oplus \epsilon,$$

meaning that $y_2$ does correspond to the symmetrical probabilistic encryption of the plaintext message x by means of the second secret matrix $M_2$ whose parameters are generated by the random vector a. The second entity 2 is therefore capable of decrypting the second ciphertext $y_2$ by means of its secret matrix $M_2$ according to the decryption method described in relation to FIG. 1b, and of obtaining the plaintext message x.

In a decryption step E25, the second entity 2 extracts the random vector a from the received pair, then adds to the second ciphertext $y_2$ the result of the product between the random vector a and the second secret matrix $M_2$. In binary, this operation corresponds to subtracting the result of the product $a \cdot M_2$ from the received vector $y_2$. It will be noted that, since $y_2$ is equal to the encrypted and noisy code word, namely $C(x) \oplus a \cdot M_2 \oplus \epsilon$, the result of this operation corresponds to the noisy code word only, namely $C(x) \oplus \epsilon$. The result obtained is subsequently decoded with the aid of the error corrector code C used by the entity 1 during the encryption step E19. Since the Hamming weight of the noise vector $\epsilon$ is less than or equal to the correction capacity t of the error corrector code, the decoding directly provides the plaintext message x.

In another embodiment of the invention, the conversion matrix $M_{12}$ is calculated by the first entity 1, or the second entity 2. For example, the first and second entities 1, 2 agree with each other for the entity 1 to calculate the conversion matrix $M_{12}$ starting from the first secret matrix $M_1$ that it holds and from the second secret matrix $M_2$ that the second entity 2 sends to it.

The conversion method is described here with a conversion entity 3 and two entities that are referred to as terminals: a first entity 1 that encrypts an unencrypted message x and a second entity 2 that decrypts the second ciphertext $y_2$ calculated by the conversion entity 3 in order to obtain the plaintext message x. The method may of course be implemented for n terminal entities, with n>2. In this case, there are n entities denoted 1, 2, . . . , n. (n−1) conversion matrices $M_{12}$, $M_{23}$, $M_{34}$, . . . , $M_{n-1 n}$ are then calculated which are transmitted to the conversion entity 3. It is indeed noted that it is unnecessary to calculate all the conversion matrices specific to all the couples of entities (i, j). On the one hand, the symmetrical nature of the conversion matrices is noted. Indeed, for a pair of entities (i, j), the associated conversion matrix $M_{ij}$ is equal to the conversion matrix $M_{ji}$ associated with the pair of entities (j, i). On the other hand, it is possible to obtain a conversion matrix for a couple (i, j) with j>i+1, starting from the calculated matrices. Indeed, it is noted that $M_{ij} = M_{i(i+1)} \oplus \ldots \oplus M_{(i+(j-j-1))j}$. For example, $M_{13} = M_{12} \oplus M_{23}$.

Figure 3:
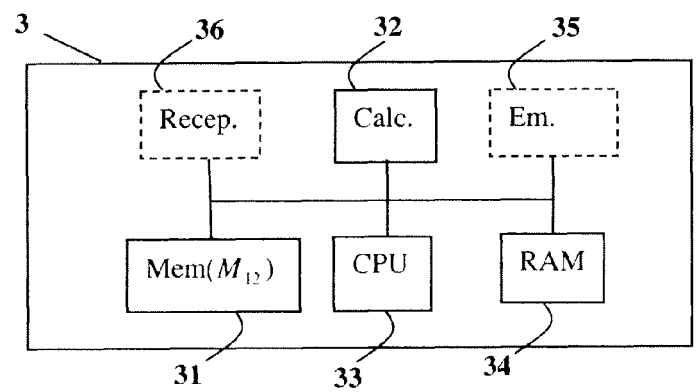
FIG. 3 shows a functional block diagram of a particular form of a conversion entity designed to implement the method in FIG. 2.

The conversion entity 3 will now be described in relation to FIG. 3.

The conversion entity 3 comprises a memory 31 for storage of a secret conversion key in the form of a secret matrix $M_{12}$, a module 32 for calculation of a second ciphertext starting from a first ciphertext. The calculation module 32 accesses the memory 31.

The conversion entity furthermore comprises:
a processing unit 33, or CPU (for Control Processing Unit),
a volatile memory 34 or RAM (for Random Access memory) used for loading code instructions, executing them, storing variables, etc.

In operation, a first ciphertext y1 (not shown in FIG. 3) is supplied at the input of the calculation module 32 which produces a second ciphertext y2 (not shown in FIG. 3) at the output.

The memory 31 is designed to store the secret matrix $M_{12}$ used for calculating the second ciphertext $y_2$ starting from the first ciphertext $y_1$. The secret matrix $M_{12}$ is calculated beforehand starting from the secret matrices $M_1$ and $M_2$ of the entities. The matrices $M_1$ and $M_2$ are for example Toeplitz matrices. By definition, these are matrices whose coefficients along a diagonal descending from left to right are the same. Thus, the conversion matrix $M_{12}$ obtained from two secret matrices of the entities by an EXCLUSIVE OR between these two matrices is also a Toeplitz matrix. Thus, all of the coefficients of the conversion matrix $M_{12}$ may be deduced from the coefficients of the first row and of the first column of the matrix alone. Thus, it suffices only store the coefficients of the first row and of the first column of the conversion matrix in order to dispose of all of the coefficients of the conversion matrix.

The memory 31 may therefore only store the coefficients of the first row and the coefficients of the first column of the conversion matrix $M_{12}$. The use of a Toeplitz matrix allows the storage capacity needed to store the coefficients of the conversion matrix $M_{12}$ to be limited.

The calculation module 32 is designed to:
calculate the product of the random vector a taken in the form of a row vector of k bits, with the secret matrix $M_{12}$, i.e. the product $a \cdot M_{12}$,
add the first ciphertext $y_1$ received at the input of the module to the result of the product $a \cdot M_{12}$.

The calculation module therefore supplies at its output the encryption of $y_1$ by means of the conversion matrix $M_{12}$, being $y_1 \oplus a \cdot M_{12}$.

The various modules communicate via a communications bus.

The calculation module 32 implements the step E22 for calculation of the second ciphertext.

In one particular embodiment of the invention, the conversion entity 3 also comprises:
a reception module 35 (dashed lines in FIG. 3), designed to receive the first ciphertext $y_1$ from a first entity,
a transmission module 36 (dashed lines in FIG. 3), designed to send the second ciphertext $y_2$, obtained at the output of the module of calculation 32, to a second entity.

In this exemplary embodiment, the reception module 35 is connected at the input to the calculation module 32, which is connected at the output to the transmission module 36.

The reception module 35 implements the reception step E21.

The transmission module 36 implements the transmission step E23.

In one exemplary embodiment, in which the conversion entity 3 receives the conversion matrix $M_{12}$, the reception module 35 is also designed to receive the conversion matrix $M_{12}$ from a third-party entity and to store it in the memory 31.

The modules 32, 34 and 35 are preferably software modules comprising software instructions for executing the steps of the method according to the invention.

They may be stored on the same computer of a network or on different computers which provide the functions of the conversion entity.

The invention therefore also relates to:
computer programs comprising instructions for the implementation of the conversion method, when these programs are executes by a processor;
a recording media readable by a computer on which the computer program described hereinabove is recorded.

The software modules can be stored in, or transmitted by a data media or carrier. This may be a hardware storage media, for example a CD-ROM, a magnetic diskette or a hard disk, or else a transmission carrier such as a signal, or a telecommunications network.

The invention claimed is:

1. A method comprising the steps:
conversion by a conversion device of a first ciphertext into a second ciphertext, the first ciphertext corresponding to a result of a symmetrical probabilistic encryption of a plaintext message element by means of a product of a first secret matrix and of a random vector, the second ciphertext corresponding to a result of a symmetrical probabilistic encryption of the plaintext message element by means of a product of a second secret matrix and of the random vector; and
calculation, by the conversion device, of the second ciphertext by encryption of the first ciphertext by means of a product of a secret conversion matrix, the secret conversion matrix being obtained by the conversion device from a confidence entity which calculates the conversion matrix by means of the first and second secret matrices respectively transmitted by the first and the second communication devices, said second secret matrix being different from the first secret matrix.

2. The method of conversion as claimed in claim 1, further comprising the steps:
reception of the first ciphertext coupled with the random vector coming from a first communication device,
transmission of the second ciphertext coupled with the random vector to a second communication device.

3. The method as claimed in claim 1, wherein the secret conversion matrix is calculated by an EXCLUSIVE OR operation between the first and the second secret matrices.

4. The method as claimed in claim 1, wherein the conversion matrix is a Toeplitz matrix.

5. A conversion device comprising:
a processing unit;
a non-transitory memory for storage of a secret conversion matrix; and
means for calculating the second ciphertext, designed to calculate the second ciphertext by encryption of the first received ciphertext by means of a product of the secret conversion matrix, said secret conversion matrix being obtained by the conversion device from a confidence entity which calculates the conversion matrix by means of the first and second secret matrices respectively transmitted by the first and the second communication devices, said second secret matrix being different from the first secret matrix; and
means for converting a first ciphertext into a second ciphertext, the first ciphertext corresponding to a result of a symmetrical probabilistic encryption of a plaintext message element by means of a product of a first secret matrix and of a random vector, the second ciphertext corresponding to a result of a symmetrical probabilistic encryption of the plaintext message element by means of a product of a second secret matrix and of the random vector.

6. The conversion device as claimed in claim 5, further comprising:
reception means designed to receive the first ciphertext coupled to a random vector,
transmission means designed to send the second ciphertext coupled with the random vector.

7. A conversion system comprising:
a conversion device designed to convert the first ciphertext into the second ciphertext, the conversion device comprising a processing unit, a non-transitory memory for storage of a secret conversion key, and means for calculating the second ciphertext, wherein means are designed to calculate the second ciphertext by encryption of the first received ciphertext by means of a product of a secret conversion matrix being obtained by the conversion device from a confidence entity which calculates the conversion matrix by means of the first and second secret matrices respectively transmitted by the first and the second communication devices, said second secret matrix being different from the first secret matrix; and means for converting a first ciphertext into a second ciphertext, the first ciphertext corresponding to a result of a symmetrical probabilistic encryption of a plaintext message element by means of a product of a first secret matrix and of a random vector, the second ciphertext corresponding to a result of a symmetrical probabilistic encryption of the plaintext message element by means of a product of a second secret matrix and of the random vector; and a confidence entity designed to calculate the conversion matrix starting from the secret matrices.

8. A non-transitory computer program product designed to be installed in a non-transitory memory of an intermediate entity, comprising instructions for implementing the steps of the conversion method as claimed in claim 1, when the program is executed by a processor.

9. A non-transitory data media on which a computer program product designed to be installed in a non-transitory memory of an intermediate entity, comprising instructions for implementing the steps of the conversion method as claimed in claim 1, when the program is executed by a processor is recorded.

* * * * *